US010843551B2

(12) United States Patent
Iwase et al.

(10) Patent No.: US 10,843,551 B2
(45) Date of Patent: Nov. 24, 2020

(54) VEHICLE FRONT STRUCTURE

(71) Applicant: TOYOTA JIDOSHA KABUSHIKI KAISHA, Toyota (JP)

(72) Inventors: Yuji Iwase, Anjyou (JP); Masataka Arimura, Kariya (JP); Satoshi Terada, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/543,906

(22) Filed: Aug. 19, 2019

(65) Prior Publication Data
US 2020/0079207 A1 Mar. 12, 2020

(30) Foreign Application Priority Data

Sep. 12, 2018 (JP) ................. 2018-170459

(51) Int. Cl.
*B60K 1/04* (2019.01)
*B60K 11/04* (2006.01)

(52) U.S. Cl.
CPC ..................... *B60K 11/04* (2013.01)

(58) Field of Classification Search
CPC ........ B60K 11/00; B60K 11/04; B60K 11/085
See application file for complete search history.

(56) References Cited

U.S. PATENT DOCUMENTS

| 1,660,146 | A | * | 2/1928 | Winans | F01P 7/10 |
| | | | | | 165/11.1 |
| 2,276,278 | A | * | 3/1942 | Abrams | 431/147 |
| 3,759,056 | A | * | 9/1973 | Graber | B60H 1/3227 |
| | | | | | 62/183 |
| 4,429,666 | A | * | 2/1984 | Surace | B60K 11/08 |
| | | | | | 123/41.05 |
| 6,966,596 | B1 | * | 11/2005 | Rinehart | B62D 33/0273 |
| | | | | | 296/57.1 |
| 8,983,735 | B2 | * | 3/2015 | Konishi | B60K 11/085 |
| | | | | | 701/49 |
| 9,616,742 | B1 | * | 4/2017 | Uehara | B60K 11/085 |
| 9,902,256 | B2 | * | 2/2018 | Yamamoto | B60K 11/04 |
| 10,029,558 | B2 | * | 7/2018 | Frayer, III | B60K 11/085 |
| 10,202,034 | B2 | * | 2/2019 | Ruppert | B60K 11/085 |

FOREIGN PATENT DOCUMENTS

| JP | 2003-154967 A | 5/2003 |
| JP | 2003-306046 A | 10/2003 |
| JP | 2006-168591 A | 6/2006 |
| JP | 2018-52405 A | 4/2018 |

* cited by examiner

*Primary Examiner* — John D Walters
*Assistant Examiner* — James J Triggs
(74) *Attorney, Agent, or Firm* — Oliff PLC

(57) ABSTRACT

A vehicle front structure includes a grille opening disposed in a front end of a front compartment of a vehicle, a radiator disposed rearward of the grille opening in the front compartment; and an air guide having a folded wall shape and extending along a length of the vehicle between an outward side of the grille opening in a vehicle width direction and an outward end of the radiator in the vehicle width direction. The air guide includes a protruding part extending from the outward side of the grille opening in the vehicle width direction toward a center in the vehicle width direction and including a tip end portion extending to an outward end of the radiator core in the width direction of the vehicle when viewed in a front view of the vehicle.

4 Claims, 3 Drawing Sheets

VEHICLE FRONT STRUCTURE

CROSS REFERENCE TO RELATED APPLICATION

This application claims priority to Japanese Patent Application No. 2018-170459 filed on Sep. 12, 2018, which is incorporated herein by reference in its entirety including the specification, claims, drawings, and abstract.

TECHNICAL FIELD

The present disclosure relates to a vehicle front structure, and more particularly to a structure of an air guide that guides outside air to a radiator.

BACKGROUND

A front compartment of a vehicle includes a radiator for cooling coolant for an engine, a motor, and other equipment. The front compartment includes, in a vehicle front end, a grille opening for guiding outside air into the front compartment, and further includes, between the grille opening and the radiator, an air guide for guiding the outside air introduced from the grille opening to the radiator.

JP 2003-306046 A, for example, describes a structure including an air guide extending further forward of the vehicle with respect to the radiator.

SUMMARY

A radiator is composed of a radiator core and radiator tanks. The radiator core includes a plurality of tubes extending along the width of a vehicle to perform heat exchange between coolant flowing through the interior of the radiator core and outside air introduced into the radiator core. The radiator tanks are mounted on opposite sides of the radiator core in the vehicle width direction, respectively, to communicate with each tube and distribute and collect the coolant to and from each tube. According to the technique described in JP 2003-306046 A, which includes the air guide extending frontward of the vehicle from outward of the radiator tank in the vehicle width direction, the outside air introduced through the grille opening is guided around the radiator tank, which does not perform heat exchange. This structure introduces unnecessary outside air, lowering cooling performance of the radiator or aerodynamic performance of the vehicle.

An embodiment of the disclosure is therefore directed toward providing an air guide which increases cooling performance of a radiator and aerodynamic performance of a vehicle.

A vehicle front structure according to an embodiment of the disclosure includes a grille opening disposed in a front end of a front compartment of a vehicle, a radiator disposed rearward with respect to the grille opening in the front compartment, and an air guide having a folded wall shape and extending along a length of the vehicle between an outward side of the grille opening in a width direction of the vehicle and an outward end of the radiator in the width direction of the vehicle for guiding outside air introduced through the grille opening to the radiator. The radiator includes a radiator core extending along the width of the vehicle. The radiator core is configured to perform heat exchange between a heating medium flowing through the radiator core and the outside air that is introduced. The air guide includes a protruding part extending from the outward side of the grille opening in the width direction of the vehicle toward a center in the width direction of the vehicle. The protruding part includes a tip end portion extending to an outward end of the radiator core in the width direction of the vehicle when viewed in a front view of the vehicle.

As described above, the protruding part having the tip end extending to the outward end of the radiator core in the vehicle width direction when viewed in a front view of the vehicle prevents the outside air flowing through the grille opening from entering a region outward of the radiator core. This structure increases the flow rate of the outside air passing through the radiator core, of the outside air entering through the grille opening. This enables cooling with a smaller amount of introduced outside air, resulting in an increase in the cooling performance of the radiator and also in a reduction in the air resistance of the vehicle to thereby enhance the aerodynamic performance.

In the vehicle front structure according to the disclosure, the protruding part may include a front portion forming a slope surface extending from the outward side of the grille opening in the width direction of the vehicle toward the center in the width direction of the vehicle as the front portion goes from frontward toward rearward of the vehicle.

The protruding part which is thus formed in a slope surface reduces resistance of the outside air flowing into the radiator core with the guide of the air guide. It is therefore possible to increase the flow rate of the outside air passing through the radiator core, of the outside air entering through the grille opening, to thereby enhance the cooling performance.

In the vehicle front structure according to the disclosure, the protruding part may include a rear portion forming a surface extending from the center in the width direction of the vehicle toward the outward side in the width direction of the vehicle and substantially normal to the length of the vehicle.

This structure reduces the air pressure in a region located rearward with respect to the protruding part in the vehicle to thereby reduce the amount of air flowing into the front compartment without passing through the radiator core, of the outside air entering through the grille opening. This results in an increase in the ratio of the outside air passing through the radiator core, of the outside air entering through the grille opening. It is therefore possible to perform cooling with a smaller amount of outside air, to thereby enhance the cooling performance of the radiator and also reduce the air resistance of a vehicle, thereby increasing the aerodynamic performance.

The present disclosure provides an air guide that increases cooling performance of a radiator and aerodynamic performance of a vehicle.

BRIEF DESCRIPTION OF DRAWINGS

An embodiment of the present disclosure will be described by reference to the following figures, wherein.

DESCRIPTION OF EMBODIMENTS

A vehicle front structure 10 according to an embodiment will be described by reference to the drawings. In each drawing, an arrow FR, an arrow UP, and an arrow RH indicate the frontward direction (traveling direction), upward direction, and rightward direction of a vehicle, respectively. Directions opposite to these arrows FR, UP, and RH indicate the rearward direction, downward direction, and leftward direction of the vehicle, respectively. In the following description, unless otherwise specified, frontward and rearward, leftward and rightward, and upward and downward refer to frontward and rearward along the length of a vehicle, leftward and rightward along the width of the vehicle, and upward and downward along the height of the vehicle, respectively.

Figure 1:
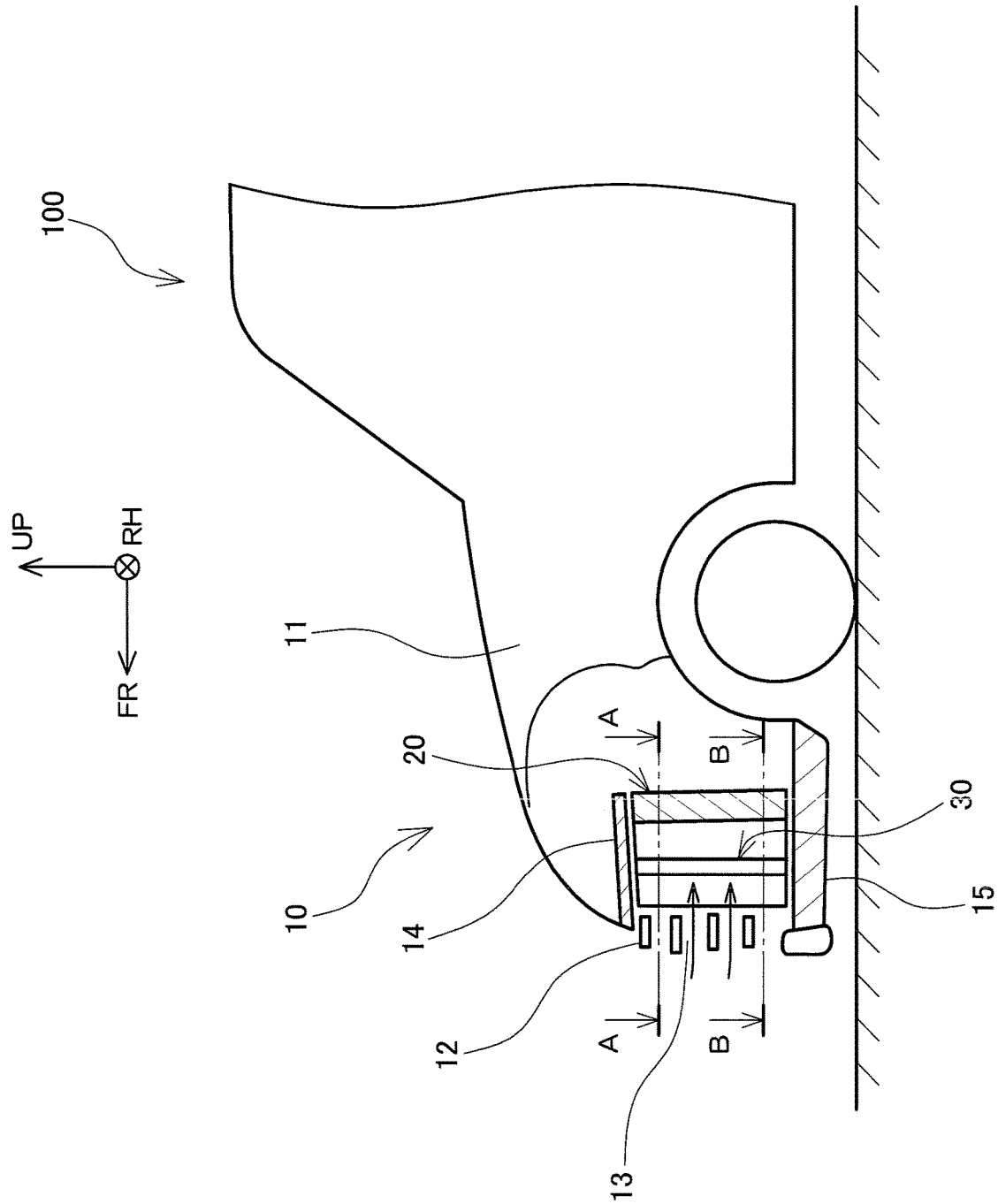
FIG. 1 is a partial side sectional view of a vehicle including a vehicle front structure according an embodiment.
Figure 2:
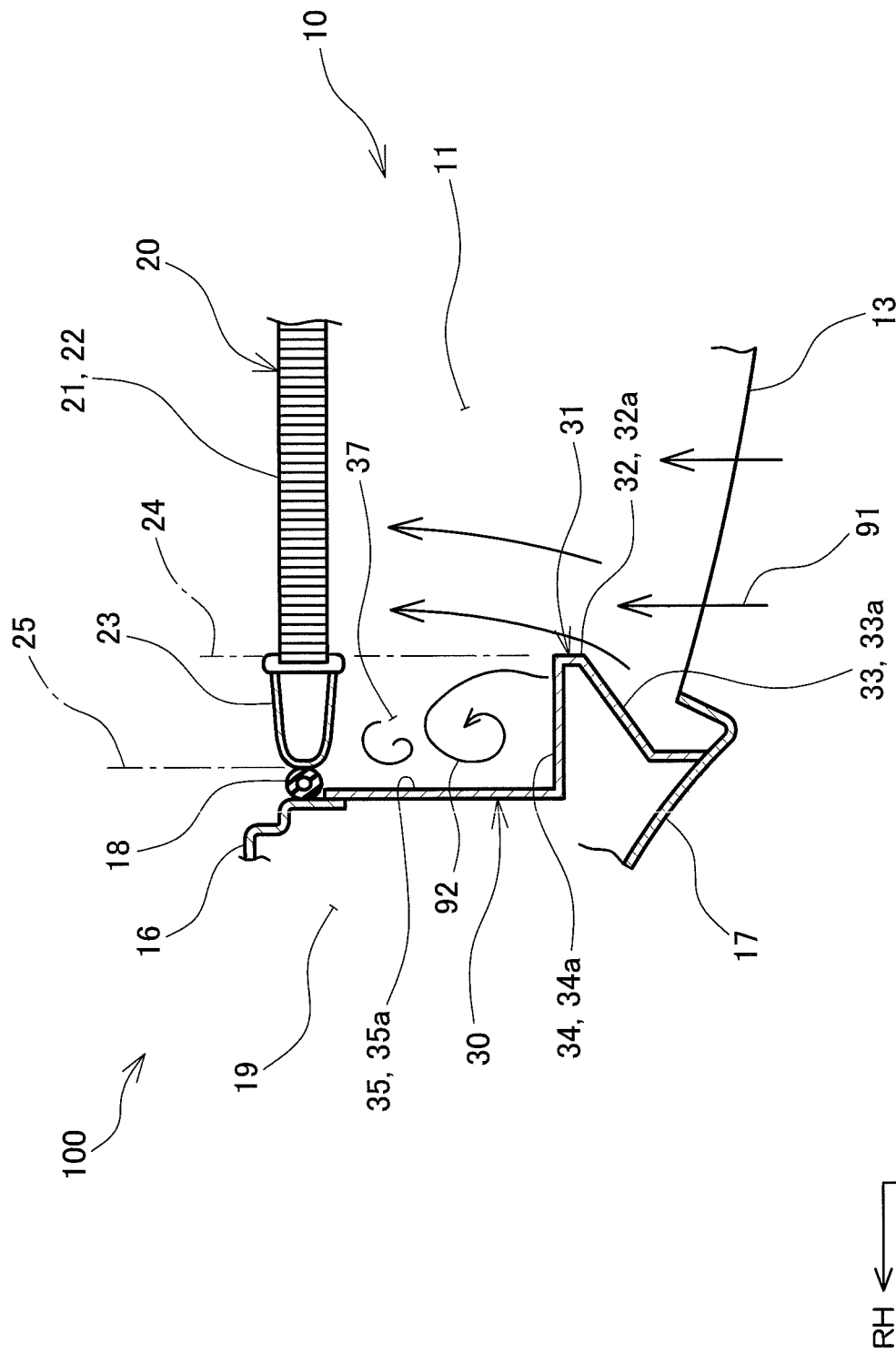
FIG. 2 is a plane cross sectional view of an air guide and a radiator on the right side in the upper portion of the vehicle front structure according to the embodiment, taken along line A-A in FIG. 1.
Figure 3:
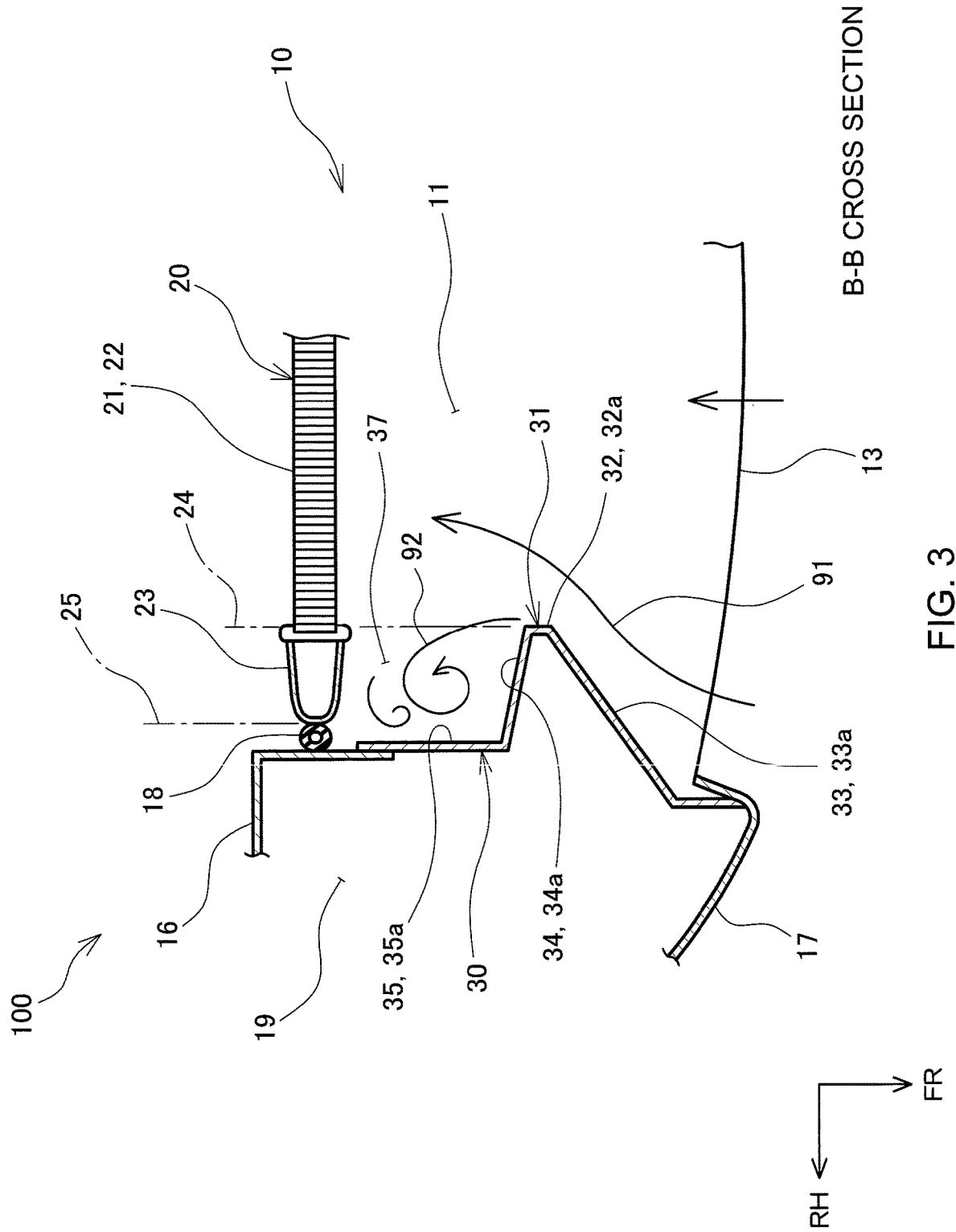
FIG. 3 is a plane cross sectional view of the air guide and the radiator on the right side in the lower portion of the vehicle front structure according to the embodiment, taken along line B-B in FIG. 1.

As illustrated in FIG. 1, a vehicle 100 including a vehicle front structure 10 according to the present embodiment includes, in a front portion, a front compartment 11. The front compartment 11 is a space that houses equipment such as an engine and a motor, and a radiator. The front compartment 11 includes, in a front end of the vehicle, a grille 12 having a grille opening 13. The grille opening 13 is an outside air inlet port through which outside air is introduced into the front compartment 11. A radiator 20 is disposed rearward with respect to the grille opening 13. A radiator cover 14 is disposed between the upper end of the grille opening 13 and the upper end of the radiator 20, a lower absorber 15 is disposed between the lower end of the grille opening 13 and the lower end of the radiator 20. Between an outward side of the grille opening 13 in the vehicle width direction and an outward side of the radiator 20 in the vehicle width direction, each of a pair of left and right air guides 30, which will be described below by reference to FIGS. 2 and 3, is disposed. The radiator cover 14, the lower absorber 15, and the pair of left and right air guides 30 form an air flow channel that guides the outside air introduced through the grille opening 13 to the radiator 20.

FIG. 2 is a plane cross sectional view of the air guide 30 and the radiator 20 on the right side in the upper portion of the vehicle, taken along line A-A in FIG. 1, and FIG. 3 is a plane cross sectional view of the air guide 30 and the radiator 20 on the right side in the lower portion of the vehicle, taken along line B-B in FIG. 1. The structures of the air guide 30 and the radiator 20 on the right side of the vehicle will be described by reference to FIGS. 2 and 3. The structures of the air guide 30 and the radiator 20 on the left side of the vehicle are the same as those of the air guide 30 and the radiator 20 on the right side.

As illustrated in FIGS. 2 and 3, the radiator 20 is composed of a radiator core 22 and radiator tanks 23. The radiator core 22 includes a plurality of tubes 21 extending along the vehicle width to perform heat exchange between a coolant which is a heating medium flowing through the radiator core 22 and outside air introduced through the grille opening 13. The radiator tanks 23 are attached to opposite ends of the radiator core 22 in the vehicle width direction, respectively, to communicate with each tube 21, and distribute the coolant to each tube 21 and collect the coolant flowing from each tube 21. The radiator tanks 23 do not perform heat exchange with the outside air introduced through the grille opening 13.

The radiator 20 is supported by a radiator support 16, and a space between the outward side of the radiator tank 23 in the vehicle width direction and the radiator support 16 is sealed with a sponge seal 18. In FIGS. 2 and 3, a dashed and single-dotted line 24 indicates an outward end of the radiator core 22 in the vehicle width direction, and a dashed and single-dotted line 25 indicates an outward end of the radiator tank 23 in the vehicle width direction. As the outward end of the radiator tank 23 in the vehicle width direction is the outward end of the radiator 20 in the vehicle width direction, the dashed and single-dotted line 25 also indicates the outward end of the radiator 20 in the vehicle width direction.

As illustrated in FIG. 2, the air guide 30 is a folded wall member extending along the length of the vehicle between the outward side of the grille opening 13 and the outward end of the radiator 20 (the outward end of the radiator tank 23) in the vehicle width direction to guide the outside air introduced through the grille opening 13 to the radiator 20.

The air guide 30 is a folded plate member including a protruding part 31 located frontward of the vehicle and a coupling portion 35 located rearward of the vehicle. The protruding part 31 includes a front portion 33 located frontward of the vehicle, a rear portion 34 located rearward of the vehicle, and a tip end portion 32 between the front portion 33 and the rear portion 34.

The front portion 33 is connected, at its forward end, to a vehicle front panel 17 of the front compartment 11 outward of the grille opening 13 in the vehicle width direction. As illustrated in FIG. 2, the front portion 33 extends diagonally rearward of the vehicle 100 toward the center in the vehicle width direction as it goes from its forward end toward the rear of the vehicle. The front portion 33 extends toward the center in the vehicle width direction to the dashed and single-dotted line 24 indicating the outward end of the radiator core 22 in the vehicle width direction. The end of the front portion 33 toward the vehicle center is connected to the tip end portion 32.

The tip end portion 32 is a short portion extending longitudinally along the dashed and single-dotted line 24 indicating the outward end of the radiator core 22 in the vehicle width direction. As the tip end portion 32 extends to the outward end of the radiator core 22 in the vehicle width direction, the length between the respective tip end portions 32 of the protruding parts 31 of the pair of left and right air guides 30 is equal to the length of the radiator core 22 along the width of the vehicle. The rearward end of the tip end portion 32 is connected to the rear portion 34.

The rear portion 34 is a plate member extending from the rearward end of the tip end portion 32 outward in the vehicle width direction along the width of the vehicle. The rear portion 34 extends outward along the width of the vehicle to the dashed and single-dotted line 25 indicating the outward end of the radiator 20 in the vehicle width direction. The surface of the rear portion 34 facing in the rearward direction of the vehicle, which will be referred to as the rearward surface of the rear portion 34, is substantially normal to the longitudinal direction of the vehicle. The outward end of the rear portion 34 is connected to the coupling portion 35.

The coupling portion 35 is a flat plate member extending from the outward end of the rear portion 34 toward the rear of the vehicle. The rearward end of the coupling portion 35 is connected to the radiator support 16.

An inward surface of the front portion 33 in the vehicle width direction forms a slope surface 33a extending from the outward side toward the center of the grille opening 13 in the vehicle width direction as it goes from the front to the rear of the vehicle. The rearward surface of the rear portion 34 forms a surface 34a which is substantially normal to the length of the vehicle and is extending from the center toward the outward side along the width of the vehicle. The front portion 33, the rear portion 34, and the tip end portion 32 form the protruding part 31 extending from the outward side to the center of the grille opening 13 in the vehicle width direction and also extending along the height of the vehicle. The tip end portion 32 extends to the outward end of the radiator core 22 in the vehicle width direction, when viewed in a front view of the vehicle.

As illustrated in FIG. 3, the air guide 30 in the lower portion of the vehicle has a structure similar to the air guide 30 in the upper portion of the vehicle except for the following: the front portion 33 of the protruding part 31 is longer to correspond to the width of the grille opening 13; and the surface 34a of the rear portion 34 is slightly inclined with respect to the direction normal to the length of the vehicle.

Flow of the air generated when the vehicle 100 having the vehicle front structure 10 described above travels will be described. As illustrated in FIGS. 2 and 3, when the vehicle 100 travels, the outside air flows into the front compartment 11 through the grille opening 13 in the front portion of the vehicle as indicated by an arrow 91. The air flowing into the front compartment 11 further flows rearward of the vehicle along the slope surface 33a of the protruding part 31 of the air guide 30. As the air flow channel through which the air flows has a contraction shape because of the protruding part 31, the air flowing along the slope surface 33a gradually accelerates its flow rate, lowering the pressure accordingly.

The surface 34a of the rear portion 34 of the protruding part 31 is substantially normal to the longitudinal direction of the vehicle, and forms an air flow channel which rapidly expands substantially normally to the flow direction. Therefore, the air passing beyond the protruding part 31 generates a vortex of air in a region located rearward with respect to the protruding part 31, as indicated by an arrow 92 in FIG. 2. Because of this, a region 37 formed by the surface 34a of the rear portion 34 of the protruding part 31, the surface 35a of the coupling portion 35, the dashed and single-dotted line 24 indicating the outward end of the radiator core 22 in the vehicle width direction, and the frontward surface of the radiator tank 23, is made a backflow region of the air where the mainstream of air flowing through the grille opening 13 does not enter.

Thus, in the region between the protruding part 31 and the radiator core 22, the width of the air flow channel is limited to the width between the tip end portions 32 of the protruding parts 31 of the pair of left and right air guides 30, and the mainstream of the air flowing through the grille opening 13 does not enter the region 37. The width between the tip end portions 32 of the protruding parts 31 of the pair of left and right air guides 30 is equal to the width of the radiator core 22 along the vehicle width. This structure inhibits the mainstream of the air flowing through the grille opening 13 from entering the region around the radiator tanks 23 disposed outward of the radiator core 22 and free from heat exchange, thus increasing the flow rate of air passing through the radiator core 22. This enables cooling with a smaller amount of the introduced outside air, thereby increasing the cooling performance of the radiator 20. The smaller amount of the introduced outside air further reduces air resistance of the vehicle 100 to thereby increase the aerodynamic performance.

In the region between the protruding part 31 and the radiator core 22, the width of the air flow channel is limited to the width between the protruding parts 31 of the pair of left and right air guides 30. This structure allows the air passing protruding part 31 to enter the radiator core 22 at a high flow rate which has been maintained after passing the protruding part 31. This reduces the pressure of air between the protruding part 31 and the radiator core 22, which further reduces a differential pressure between the air pressure in the region 37 and the pressure in the internal region 19 of the front compartment 11 outward of the coupling portion 35 in the vehicle width direction.

This structure reduces the amount of air flowing out from the region 37 into the region 19 through a space between the coupling portion 35 and the radiator support 16 or a space between the sponge seal 18 and the radiator support 16. This results in an increase in the ratio of the air passing through the radiator core 22, of the outside air entering through the grille opening 13, allowing cooling with a smaller amount of introduced outside air. This increases cooling performance of the radiator 20 and also reduces the air resistance of the vehicle 100 to thereby increase the aerodynamic performance.

The invention claimed is:

1. A vehicle front structure, comprising:
   a grille opening disposed in a front end of a front compartment of a vehicle;
   a radiator disposed rearward with respect to the grille opening in the front compartment; and
   an air guide having a folded wall shape, the air guide extending along a length of the vehicle between an outward side of the grille opening in a width direction of the vehicle and an outward end of the radiator in the width direction of the vehicle, the air guide guiding outside air introduced through the grille opening to the radiator, wherein
   the radiator comprises a radiator core extending along the width of the vehicle, the radiator core being configured to perform heat exchange between a heating medium flowing through the radiator core and the outside air that is introduced, and
   the air guide comprises a protruding part extending from the outward side of the grille opening in the width direction of the vehicle toward a center in the width direction of the vehicle, the protruding part comprising a tip end portion extending to an outward end of the radiator core in the width direction of the vehicle when viewed in a front view of the vehicle.

2. The vehicle front structure according to claim 1, wherein
   the protruding part comprises a front portion forming a slope surface extending from the outward side of the grille opening in the width direction of the vehicle toward the center in the width direction of the vehicle as the front portion goes from frontward toward rearward of the vehicle.

3. The vehicle front structure according to claim 1, wherein
   the protruding part comprises a rear portion forming a surface extending from the center in the width direction of the vehicle toward the outward side in the width direction of the vehicle, the surface being substantially normal to the length of the vehicle.

4. The vehicle front structure according to claim 2, wherein
   the protruding part comprises a rear portion forming a surface extending from the center in the width direction of the vehicle toward the outward side in the width direction of the vehicle, the surface being substantially normal to the length of the vehicle.

* * * * *